United States Patent [19]
Wistreich et al.

[11] 3,908,031
[45] Sept. 23, 1975

[54] ETHANOL VAPOR STERILIZATION OF NATURAL SPICES AND OTHER FOODS

[75] Inventors: Hugo E. Wistreich; George J. Thundiyil; Hyunil Juhn, all of Chicago, Ill.

[73] Assignee: B. Heller and Co., Chicago, Ill.

[22] Filed: Mar. 12, 1973

[21] Appl. No.: 340,220

[52] U.S. Cl. .............. 426/335; 21/58; 34/DIG. 9; 34/DIG. 15; 426/521; 426/221
[51] Int. Cl.² ............................................. A23L 3/34
[58] Field of Search .......... 426/335, 320, 419, 286, 426/521; 23/272.6 S; 34/DIG. 9, DIG. 15; 21/58

[56] References Cited
UNITED STATES PATENTS

| | | | |
|---|---|---|---|
| 1,636,550 | 7/1927 | Buel | 23/272.6 S |
| 2,198,198 | 4/1940 | Musher | 426/328 |
| 3,619,201 | 11/1971 | Archer | 426/286 |
| 3,647,487 | 3/1972 | Sair | 426/320 |

*Primary Examiner*—Norman Yudkoff
*Assistant Examiner*—Curtis P. Ribando

[57] ABSTRACT

A method for sterilizing materials which do not lend themselves to sterilization with high temperatures and/or steam, and particularly food and food products, wherein the material to be sterilized is contacted with ethanol in the vapor phase.

11 Claims, No Drawings

ETHANOL VAPOR STERILIZATION OF NATURAL SPICES AND OTHER FOODS

This invention relates to an improved method for sterilization and more particularly to an improved method for sterilization of foods, food products and other materials which do not lend themselves to sterilization with high temperatures and/or steam.

The classic method for sterilization of most materials is to heat them to a temperature sufficient to destroy bacteria. Heat can be supplied to such materials by direct heat transfer or by means of a heat transfer fluid, most frequently steam. However, certain materials and particularly foods and food products are temperature sensitive in that the use of steam or the like to sterilize such food or food products tends to cook the food products.

One unique class of food products with respect to sterilization techniques is that of spices such as pepper, nutmeg, cloves and the like. One method for the sterilization of pepper is described in U.S. Pat. No. 2,615,813 in which the oleo resin constituting the essence of the spice is extracted from the spice particles by means of a solvent such as trichloroethylene by heating the spice particles in the presence of the solvent for several hours. Thereafter, the solvent phase containing the oleo-resinous spice essence is removed from the spice particles and the solid phase or spice particles are bleached with hydrogen peroxide. After the bleaching operation, the solvent phase containing the essence is admixed with the bleached spice particles and the solvent evaporated to deposit the essence throughout the spice particles.

As will be appreciated by those skilled in the art, such complex procedures as described in the foregoing patent are quite expensive to carry out on a commercial scale. It has been proposed to sterilize spices with steam; while the use of steam is less expensive, the steam forms an azeotrope with volatile oils of the spice essence. Consequently, a portion of the essence is lost through the azeotrope to thereby reduce the potency of the spice. Low temperature sterilization of spices has been carried out with ethylene oxide or propylene oxide gas. This procedure is disadvantageous because such oxides are explosive and tend to react with salt to form the corresponding chlorohydrin. Furthermore, the sterilization is only partial.

It is accordingly an object of the present invention to provide a method for the sterilization of materials which do not lend themselves to sterilization with water which overcomes the foregoing disadvantages.

It is a more specific object of the invention to provide a method for the sterilization of foods and for food products in which the use of high temperatures is completely avoided to provide products in which the bacteria count is significantly reduced.

It is a further object of the invention to provide a method for the sterilization of spices in which the bacteria count is significantly reduced without loss in potency of the spices.

The concepts of the present invention reside in a method for the sterilization of materials which do not lend themselves to sterilization with heat and/or steam in which the material to be sterilized is contacted with ethanol in the vapor phase. It has surprisingly been found that ethanol vapor is more effective as a sterilizing medium than heat or ethanol in the liquid phase.

The method of the invention is particularly well suited for use in the treatment of food or food products where the use of high temperatuers should be avoided to prevent cooking since relatively low temperatures can be employed. The method of the invention is uniquely applicable to the sterilization of spices because the spice essences do not form azeotropes rich in such essences with the ethanol and, thus, the use of ethanol prevents the loss of any significant amounts of essences in the form of an azeotrope.

In accordance with the practice of the invention, the material to be sterilized is contacted with the ethanol vapor. Use can be made of pure ethanol, if desired, but it is usually preferred to employ ethanol in the form of its 95% by volume azeotrope with water. Best results are usually obtained where the ethanol employed contains at least 80% ethanol by volume. Since ethanol and its 95% azeotrope boil at 78°C. (173°F), the method is usually carried out at a temperature of at least 78°C to insure that the ethanol is in the vapor phase.

The upper temperature limit is not critical to the practice of this invention and depends upon the material being sterilized and the apparatus employed since the use of higher temperatures entails the use of higher pressures. In general, temperatures up to 150°C can advantageously be used; higher temperatures may be employed but it is frequently disadvantageous to do so because of the high pressures involved. It has been found that best results are usually achieved with autogenous pressures.

Treatment with the ethanol vapor is carried out for a time sufficient to markedly reduce the bacteria count of the material being sterilized. In general, contact times of 5 to 120 minutes are suitable. It is frequently preferred that the material being sterilized be heated, either prior to or concurrently with the contact with the ethanol, to a temperature sufficient to prevent condensation of the ethanol on the material being sterilized. It is usually sufficient to heat the material being sterilized to a temperature at least 20°C below the temperature of the alcohol vapor up to a temperature preferably equal to that of the alcohol vapor.

The method of this invention is particularly well suited for the treatment and sterilization of a variety of natural spices including peppers (e.g., black pepper), nutmeg, cloves and the like. Because ethanol does not form an azeotrope rich with the volatile oils contained in the essence of such natural spices, the ethanol does not result in the loss of such oils as is the case with steam. The ethanol can be substantially eliminated or removed from the spices to leave virtually no residue. Ethanol is non-toxic and, therefore, even if it is not completely removed, the product is safe for human consumption.

The method of this invention is also suitable for use in the sterilization of food products such as hard, hydrogenated fats, grain and grain flours (e.g., wheat) and dehydrated or partially dehydrated fruits such as raisins, prunes, apricots, apples, etc. Since low temperatures can be employed, the method of the invention minimizes the deleterious effects of heat on such materials.

Having described the basic concepts of the invention, reference is now made to the following examples to illustrate the practice of the invention.

EXAMPLE 1

This example illustrates that the use of ethanol in the vapor phase is more effective in the sterilization of spices, such as black pepper, than heat or ethanol in the liquid phase. A series of three tests was carried out using regular ground black pepper which had an average bacteria count of 3,800,000 per gram. In the first test, a sample of 50 g of regular black pepper was heated in a water bath at a temperature of 190°–194°F for 40 minutes. In the second test, a sample of 50 g of black pepper was mixed with 10 ml of 95% ethanol by volume in a closed Petri dish which was maintained at room temperature for 40 minutes. Thereafter the ethanol was evaporated, with care being taken to avoid contamination of the pepper by bacteria from the air.

In the third test, which embodies the concepts of this invention, 50 g of black pepper in a cylinder dipped in a glycerin bath at 200°F was washed by ethanol vapor supplied from a separate heated ethanol vessel for 40 minutes. This design enabled us to maintain the contact temperature at the boiling point of ethanol, 173°F.

Each of the above tests was carried out on three different samples of black pepper. After completion of the treatment, the bacteria count for each sample of the three tests was measured to determine the extent to which the pepper had been pasteurized. The results of these tests are shown in the following table:

TABLE I

| Test | Treatment | Average Bacteria Count (bact/gram) | Bacteria Count of each Sample (bact/gram) |
|---|---|---|---|
| 1 | Heat alone | 850,000 | 9.2, 11.0, 5.4 × $10^5$ |
| 2 | Liquid ethanol | 1,000,000 | 11.0, 10.0, 9.7 × $10^5$ |
| 3 | Ethanol vapor | 57,000 | 3.3, 5.8, 11.0 × $10^3$ |
| Control | | 3,800,00 | 8.4, 1.7, 1.2 × $10^6$ |

As can be seen from the data in the foregoing Table, the effects of alcohol vapor were markedly superior in providing treated black pepper having a low bacteria count as contrasted to black pepper which had been simply heated or black pepper which had been treated with ethanol in the liquid phase.

EXAMPLE 2

This example illustrates that the method of this invention avoids the loss of essences of spices as contrasted to the use of steam in the sterilization of oregano. 100 g of oregano was treated in an autoclave with steam and with ethanol vapor for periods of 30 minutes and 60 minutes, respectively. After treatment, the oregano was analyzed to determine the amount of oil remaining in the oregano. The results of these tests are shown in the following table.

TABLE II

|  | $H_2O$ | Ethanol |
|---|---|---|
| Amount autoclaved | 100 g | 100 g |
| Pressure (psi) | 15 | 19 |
| Time (min) | 30 | 60 |
| % Oil yield | 2.00 | 2.18 |

As can be seen from the foregoing table, the use of ethanol results in a product containing significantly greater amounts of volatile oils and, thus, this test demonstrates the beneficial effect on the potency of the spices through the use of ethanol as contrasted with steam for the sterilization of such spices.

EXAMPLE 3

This example illustrates the effects of contact time upon the bacteria count. A series of tests were carried out in which 20 gram samples of black pepper were contacted with ethanol in the vapor phase at a pressure of 20 psi which corresponds to an ethanol temperature of 211°F. The results of these tests are shown in the following table.

TABLE III

| Test | Time (min) | Bacteria Count |
|---|---|---|
| Control |  | 0.5 to 10 × $10^6$ |
| 1 | 5 | 5.0 to 10 × $10^4$ |
| 2 | 10 | 0 |
| 3 | 15 | 0 |
| 4 | 20 | 0 to 1 × $10^6$ |
| 5 | 25 | 0 |
| 6 | 30 | 0 |

Each of the samples treated was tasted by applying 0.5% by weight of each sample to cottage cheese. A panel of judges could not distinguish between the treated and untreated samples.

EXAMPLE 4

The procedure of Example 3 was repeated and samples of black pepper were contacted with ethanol in the vapor phase at a pressure of 20 psi for a period of 30 and 60 minutes in a rotating drum containing the alcohol vapor. The results of these tests are shown in the following table.

TABLE IV

| Test | Bacteria Count at 30 min. | at 60 min. |
|---|---|---|
| 1 | 0 | 0.2 to 30 × $10^5$ |
| 2 | 3 to 16.0 × $10^5$ | 2 to 80 × $10^4$ |
| 3 | 0.5 to 1.5 × $10^6$ | 7 to 40 × $10^4$ |
| 4 | 0.5 to 0.7 × $10^6$ | 0 |
| 5 | 0 to 1 × $10^5$ |  |

EXAMPLE 5

Using the procedure described in Example 4, wheat flour is contacted with ethanol vapor maintained at a temperature of 211°F and a pressure of 20 psi. Comparable results are obtained.

It will be understood that various changes and modifications can be made in the details of procedure, formulation and use without departing from the spirit of the invention, specifically as defined in the following claims.

We claim:

1. A method for sterilizing foods and food products selected from the group consisting of natural spices, hydrogenated fats, grain and grain flours and dehydrated or partially dehydrated fruits comprising the steps of contacting the material with ethanol in the vapor phase maintained at a temperature within the range of 78° to 150°C for a time sufficient to reduce the bacteria load of the product, and separating the sterilized product from the vapor.

2. A method as defined in claim 1 wherein the ethanol vapor is formed from aqueous ethanol containing at least 80% ethanol by volume on a liquid basis.

3. A method as defined in claim 1 wherein the ethanol is maintained under autogenous pressure.

4. A method as defined in claim 1 wherein the material is contacted with the vapor for a time within the range of 5 minutes to 10 hours.

5. A method for sterilizing natural spices comprising the steps of contacting the spice with ethanol in the vapor phase maintained at a temperature within the range of 78° to 150°C for a time sufficient to reduce the bacteria load of the spice and separating the spice from the vapor.

6. A method as defined in claim 5 wherein the ethanol vapor is formed from aqueous ethanol containing at least 80% ethanol by volume on a liquid basis.

7. A method as defined in claim 5 wherein the ethanol is maintained under autogenous pressure.

8. A method as defined in claim 5 wherein the material is contacted with the vapor for a time within the range of 5 minutes to 10 hours.

9. A method for sterilizing black pepper comprising the steps of contacting the pepper with ethanol in the vapor phase maintained at a temperature within the range of 78° to 150°C for a time sufficient to reduce the bacteria count of the pepper and separating the pepper from the vapor.

10. A method as defined in claim 9 wherein the ethanol vapor is formed from aqueous ethanol containing at least 80% ethanol by volume on a liquid basis.

11. A method as defined in claim 9 wherein the ethanol is maintained under autogenous pressure.

* * * * *